Figure 1:
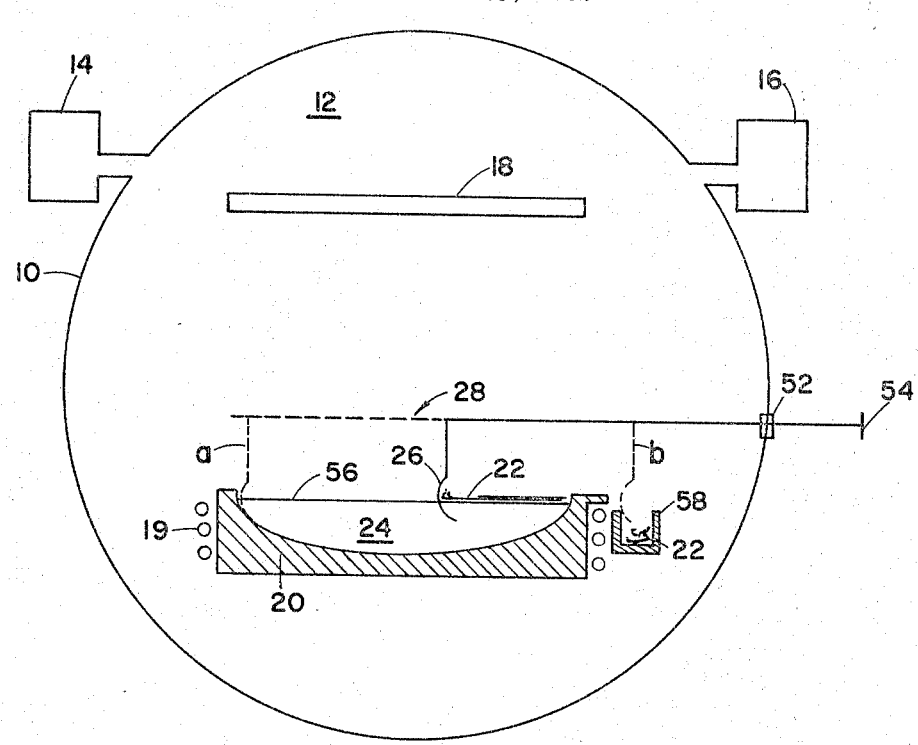

June 6, 1967    R. W. STEEVES    3,323,488
VAPOR COATING APPARATUS EMPLOYING CRUCIBLE SCRAPING MEANS
Filed Dec. 21, 1962

INVENTOR.
ROBERT W. STEEVES
BY
Edward A. Gordon

United States Patent Office 3,323,488
Patented June 6, 1967

3,323,488
VAPOR COATING APPARATUS EMPLOYING CRUCIBLE SCRAPING MEANS
Robert W. Steeves, Nahant, Mass., assignor, by mesne assignments, to National Research Corporation, a corporation of Massachusetts
Filed Dec. 21, 1962, Ser. No. 246,531
1 Claim. (Cl. 118—49)

This invention relates to coating and more particularly to the coating of various substrate materials with tin by vacuum evaporation and deposition of tin.

In the coating of various metallic and non-metallic substrates with a tin film by vacuum evaporation of the tin considerable difficulty has been experienced in obtaining uniform tin coatings of high purity and high evaporation rates of the tin, which is necessary in producing bright specular metallic tin coatings for use in products requiring a high quality specular metallic appearance. The principal reason for these difficulties results from the fact that the tin metal exhibits an oxide skin on the surface of the molten metal. This oxide results either from residual oxide in the metal itself or is formed by the tin metal in combination with residual gas molecules of oxygen, water, or carbon monoxide remaining in the vacuum chamber. This coating of tin oxide forms a thin skin on the surface of the tin preventing evaporation of the tin metal thereunder. Where increased heat is used in order to obtain an increased evaporation rate there results a sporadic bursting of portions of the oxide skin due to the increased vapor pressure which builds up underneath the skin. This results in uneven or nonuniform coatings and low evaporation rates at the evaporation temperature. Additionally, the tin coatings produced are milky white, hazy or brown and non specular in appearance.

Accordingly, an object of the present invention is to provide improved apparatus for removing oxide impurities from molten tin for the purpose of providing a clean tin evaporating surface.

Another object of the present invention is to provide an apparatus which permits high evaporation rates over long periods of operation of a tin evaporating crucible.

Another object of the present invention is to provide a tin coating having a high degree of purity and uniformity and a high quality specular metallic appearance.

A still further object of the invention is to provide for high tin evaporation rates by the removal of tin oxide scum from the surface of molten tin being evaporated in a vacuum chamber.

Other objects of the invention will in part be obvious and will in part appear hereinafter.

The invention accordingly comprises the process involving the several steps and the relation and order of one of more of such steps with respect to each of the others and the apparatus possessing the construction, combination of elements and arrangement of parts which are exemplified in the following detailed disclosure and the scope of the application of which will be indicated in the claim.

Figure 2:
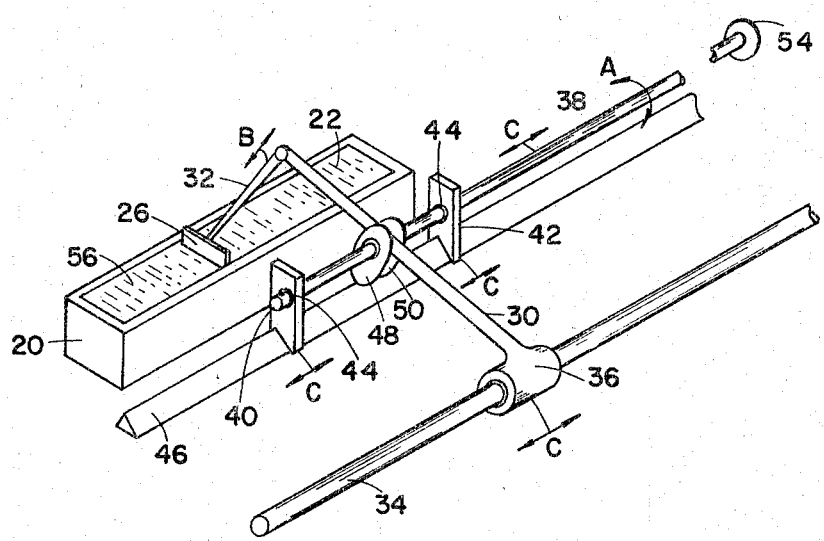

For a fuller understanding of the nature and objects of the invention, reference should be had to the following detailed description taken in connection with the accompanying drawing wherein:

FIG. 1 is a diagrammatic, schematic, partially sectional view of an apparatus embodying the present invention; and FIG. 2 is an elevated fragmentary perspective view of one preferred embodiment of the present invention.

In general, the present invention provides means which are especially adapted to mechanically remove oxide impurities and scum from a tin melt and provide a clean tin evaporating surface.

Referring now to the drawing there is shown one preferred apparatus embodying the present invention. In the preferred form of the invention 10 represents a vacuum-tight housing defining therewithin a vacuum coating chamber 12, which is arranged to be evacuated to a low pressure on the order of less than 1 micron Hg abs by means of a vacuum pumping system schematically indicated at 14.

A source of inert gas 16 is provided for back filling the chamber to the desired operating pressure. The inert gas source also provides for filling the chamber with an inert gas to protect the tin melt when the vacuum chamber is opened to the atmosphere. Within the chamber 12 the substrate 18 to be coated with the tin metal is arranged to be passed over the tin crucible 20 by suitable supply, guide and idler rolls not shown. The tin source 20 is preferably an elongated container having a length substantially equal to the width of the substrate to be coated. In the preferred embodiment the tin source is constructed as disclosed and shown in the copending application of Clough et al., Ser. No. 130,647, filed Aug. 10, 1961, now abondoned. As disclosed therein, the tin vapor source comprises a refractory base of carbon or graphite and an inner surface, which is to be exposed to the tin metal, coated with molybdenum metal. The outer surface of the refractory base is provided with a plurality of layers of refractory materials which are effective to prevent heat loss from the outer surface of the tin source. The tin source is preferably heated by induction heating coils 19. Positioned within the chamber 12 and adjacent the tin source 20 are means for mechanically removing oxide impurities 22 which form and float on the surface of the molten tin 24. The means for removing the oxide impurities consist of a scraper 26 and means, generally indicated at 28, for contacting and guiding the scraper along the upper surface of the molten tin to remove the oxide impurities.

In the preferred embodiment of the invention the scraper 26 is preferably a curved blade of substantially the entire width of the tin source 20. Preferably the scraper is formed of a metal or alloy which is inert to molten tin and does not alloy with molten tin. The scraper 26 is connected to one end of an arm 30 by a vertical member 32. The vertical member 32 is preferably pivotally attached to the arm 30 so as to permit sufficient lateral movement of the scraper to accommodate for any irregularities in the inner surface of the source 20 as the scraper passes along the upper surface of the liquid tin during removal of the oxide impurities. Additionally, the pivotal attachment of member 32 permits the scraper to maintain its horizontal position when being brought into and out of contact with the upper surface of the liquid tin. The other end of the arm 30 is preferably pivotally and slidably connected to a rod 34 by a coaxial member 36.

The scraper 26 is operated by an actuating member 38. Actuating member 38 is preferably an elongated rod which is carried by support members 40 and 42 and is rotatable relative to the support members. Collars or bands 44 are provided on the actuating member 38 on each side of the support members to hold the actuating member in engagement with the support members while still permitting rotation of the actuating member. The support members 40 and 42 are adapted to engage and move along a track member 46.

The actuating member 38 preferably carries a cam 48 between the support members 40 and 42. The cam 48 is preferably provided with a groove 50 adapted to receive arm 30 which rides on the cam when the cam is rotated.

Rotation of the actuating member 38 (as shown by the A arrow) simultaneously rotates the cam 48 thereby raising and lowering the arm 30 and the scraper 26 (as shown by the B arrow).

Movement of the actuating member 38 along the track 46 will simultaneously move the support members 42 and 44, the cam 48 and the arm 30. During such movement (as shown by the C arrows) the arm 30 is held in engagement to the cam by the walls of the groove 50.

In the preferred embodiment of the present invention the actuating member 38 extends outside the chamber wall 10 through a suitable vacuum seal 52 and terminates in a handle means 54.

In operation of the device shown in the drawing the substrate 18 such as, for example, a flexible plastic, paper or textile material, is positioned within the vacuum chamber 12 and a charge of tin metal placed in the source 20. The vacuum chamber 12 is then evacuated to a pressure on the order of one micron Hg abs or less by vacuum pumping means 14. The chamber is then preferably back filled with an inert gas such as argon from the inert gas source 16 to a pressure of between 50 and 200 microns. The tin metal is then heated by induction heating coils 19. As the temperature is raised, the tin becomes molten at a temperature of about 300° C. At this point an oxide film appears on the surface of the molten tin metal. This oxide film is then removed as follows: the handle 54 of the actuating member 38 is turned to raise the scraper 26 sufficiently above the tin source so that clearance of the source is attained. The actuator 38 is then moved forwardly until the scraper is adjacent the forward end of the crucible. At this point the actuator 28 is turned to lower the scraper and bring it into contact with the upper surface of the tin melt as shown by the dotted line *a* of FIG. 1. From this extended position the actuator 38 is then withdrawn so as to cause the scraper to move across the upper surface of the tin melt and remove the oxide impurities 22, leaving a clean tin evaporating surface 56. When the scraper reaches the opposite end of the crucible, the sequence of raising the scraper is repeated to sufficiently raise the scraper and carry the oxide impurities over the edge of the crucible, the movement of the scraper being continued until the scraper has assumed a retracted position as shown by the dotted line *b* of FIG. 1. At this position the oxide impurities are removed from the crucible. In one preferred embodiment of the present invention a receptacle 58 is provided to receive the removed oxide impurities. At this point the temperature of the tin is further raised. At a temperature of about 1200° C. wetting of the inner surface of the crucible begins and at a temperature of about 1300° C. evaporation of the tin begins. The temperature of the tin is then preferably raised to at least about 1400° C. to 1600° C. and the substrate moved over the source of tin vapors at a speed of up to about 1000 feet per minute. In this manner smooth, even, and rapid evaporation of the tin is attained. Tin coatings produced are uniform, adherent of high purity and have a highly specular metallic appearance.

While one preferred embodiment of the invention has been described, other forms thereof may be employed. For example, the geometric shape of the scraper may be varied to provide a scoop shape or other suitable configuration. Equally other means of raising and lowing the scraper may be employed. For example, the cam may be omitted and the actuating member provided with a sufficient square or round bend between the support members to raise and lower the arm 30 by rotating the actuating member. In this form a suitable groove or clamps on the bend may be employed to engage the arm 30 in the same manner as the groove of the cam 48. While a handle has been shown for manual operation, suitable automatic means may be employed.

Since certain changes may be made in the above process and apparatus without departing from the scope of the invention herein involved, it is intended that all matter contained in the above description, or shown in the accompanying drawing, shall be interpreted as illustrative and not in a limiting sense.

What is claimed is:

Apparatus for coating a flexible substrate with tin, said apparatus comprising a vacuum chamber, means for evacuating said chamber, means for advancing the substrate past a source of tin vapors, said source of tin vapors comprising an elongated crucible for confining a molten pool of tin which extends transversely to the direction of travel of the substrate, scraping means for contacting the entire upper surface of the molten pool of tin, means for moving said scraping means to mechanically remove oxide impurities from said pool surface to provide a clean tin evaporating surface, and means for heating said tin to an elevated temperature to cause vaporization thereof.

References Cited

UNITED STATES PATENTS

| | | | |
|---|---|---|---|
| 1,558,035 | 10/1925 | Millring | 118—422 |
| 1,572,953 | 2/1926 | Pletsch | 118—422 |
| 2,109,129 | 2/1938 | Fawcett | 202—52 |
| 2,245,425 | 6/1941 | Aungst | 118—422 |
| 2,771,047 | 11/1956 | Zimmerman | 228—34 |
| 2,812,270 | 11/1957 | Alexander | 117—107 |
| 3,066,041 | 11/1962 | Busch | 118—422 |
| 3,068,377 | 11/1962 | Kuebrick et al. | 118—49.5 |
| 3,181,968 | 5/1965 | Mandorf | 118—49.1 X |

FOREIGN PATENTS

| | | |
|---|---|---|
| 617,613 | 2/1949 | Great Britain. |
| 629,513 | 9/1949 | Great Britain. |

ALFRED L. LEAVITT, *Primary Examiner.*

RICHARD D. NEVIUS, *Examiner.*

A. GOLIAN, *Assistant Examiner.*